M. JUDD.

FASTENERS FOR THE MEETING-RAILS OF SASHES.

No. 6,907. Reissued Feb. 8, 1876.

Witnesses,

Chas. H. Smith
Harold Sewell

Inventor.

Morton Judd.

per Lemuel W. Serrell

Atty.

N. PETERS, PHOTO-LITHOGRAPHER, WASHINGTON, D. C.

UNITED STATES PATENT OFFICE.

MORTON JUDD, OF WALLINGFORD, CONNECTICUT.

IMPROVEMENT IN FASTENERS FOR THE MEETING-RAILS OF SASHES.

Specification forming part of Letters Patent No. 139,895, dated June 17, 1873; reissue No. 6,907, dated February 8, 1876; application filed January 24, 1876.

*To all whom it may concern:*

Be it known that I, MORTON JUDD, of Wallingford, in the county of New Haven and State of Connecticut, have invented an Improvement in Window-Sash Fastenings, of which the following is a specification:

The object of this invention is to prevent the lever of the fastening being moved by a knife or thin instrument introduced between the meeting-rails of the sash. The swinging lever is made with a notch in one side to effect said object.

The box of the sash-fastener is provided with a pivot for the lever to swing upon, which pivot is so located with reference to the edges of the box that the top plate of the box will be firmly held in place by such pivot, and, in order that the knob of the lever may be sufficiently far back to be out of the way of the sash when the lever is turned aside against the edge of the box, I make the end of such lever curved backwardly with the knob at the end of such lever.

Figure 2:
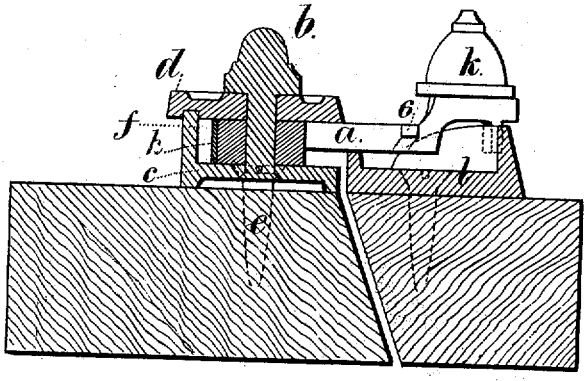
Figure 1:
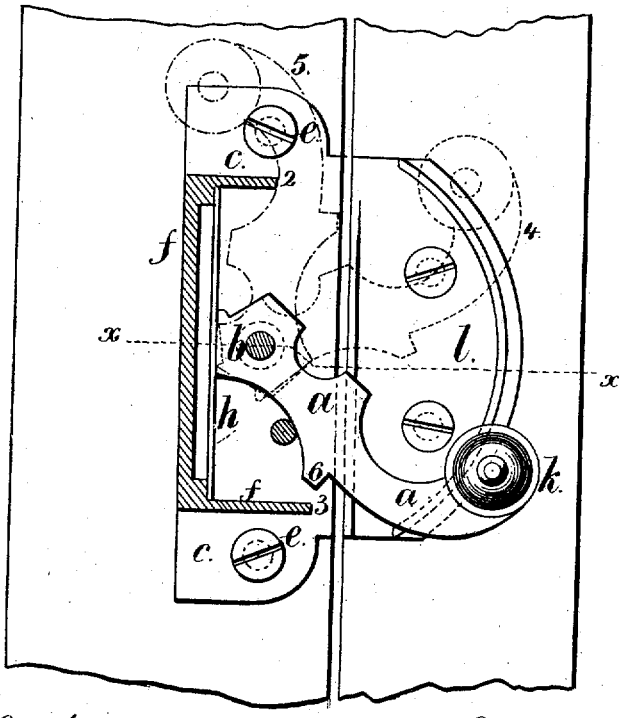

In the drawing, Figure 1 is a plan of the fastening, with the box in section; and Fig. 2 is a vertical section at the line *x x*.

The sash-fastening lever *a* is made with an eye at one end, through which the pivot-screw or rivet *b* passes to connect such lever to the plates *c* and *d*. The plate *c* is to be attached to the meeting-rail of the upper sash by the screws *e*, and upon such plate *c* is a three-sided box, *f*, upon the upper edges of which the cap-plate *d* rests, and is secured by the said pivot *b*.

The side of the box at 2 does not extend to the front edge of the plate *c*, for a purpose hereafter named, but the pivot *b* is within a straight line drawn from the edge 2 to the edge 3 of the box *f*, so that the cap-plate *d* will be firmly held to the top edges of such box by the screw or rivet *b*. The eye of the lever *a* is shown with three bearing-points for the spring *h*, so that the lever *a* may stand in the position shown by the full lines in Fig. 1, or by the dotted lines at 4, or back out of the way of the lower sash, as represented by the dotted lines at 5.

The shape of this lever *a* is peculiar, the end curving around and receiving the knob *k*, the object of this being to allow the lever to occupy the space between the edge 2 of the box and the edge of the plate *c*, and throw the knob *k* sufficiently back to be clear of the meeting-rail of the lower sash. This shape given to the lever *a* is also advantageous in keeping the knob *k* forward and over the locking-plate *l*, when the lever *a* is thrown to the extreme position shown by full lines in Fig. 1. I remark that the locking-plate *l* and the downward projection from the lever *a* are of usual character.

The lever *a* has a projection, 6, forming a notch or angle at one side, and in case an effort is made to move the lever *a* by a knife or other thin instrument introduced between the meeting-rails the same enters this notch, and, in consequence of the lever not standing at right angles to the meeting-rails, any movement given to such lever will bind the knife against the meeting-rail of the lower sash in such a manner as to prevent further motion. Under ordinary circumstances the lever *a* may only be moved to the position shown by the dotted lines at 4, but when moved to the position shown by full lines, Fig. 1, it will be burglar-proof.

I claim as my invention—

1. The sash-fastening lever *a*, made with the projection 6 at one side, substantially as and for the purposes set forth.

2. The lever *a*, with the end thereof curved backwardly, and having the knob *k*, in combination with the box containing the pivot of the lever, and against the edge 2 of which box the lever *a* swings when turned back, as and for the purposes set forth.

3. The box *f*, cast upon the plate *c*, in combination with the cap-plate *d* and rivet or screw *b* that secures said cap-plate, and forms a pivot for the lever *a*, as set forth.

Signed by me this 17th day of January, A. D. 1876.

MORTON JUDD.

Witnesses:
GEO. T. PINCKNEY,
CHAS. H. SMITH.